United States Patent
Liu et al.

(10) Patent No.: US 12,363,086 B2
(45) Date of Patent: Jul. 15, 2025

(54) VEHICLE INCIDENT DATA RECOVERY OF DISTRIBUTED VEHICLE EVENT DATA

(71) Applicant: International Business Machines Corporation, Armonk, NY (US)

(72) Inventors: Tao Liu, Leander, TX (US); Xinpeng Liu, Austin, TX (US); Xiaoyun Xu, Leander, TX (US); Yang Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 18/219,265

(22) Filed: Jul. 7, 2023

(65) Prior Publication Data
US 2025/0016143 A1    Jan. 9, 2025

(51) Int. Cl.
| | | |
|---|---|---|
| G06F 15/16 | (2006.01) | |
| G07C 5/00 | (2006.01) | |
| H04L 9/40 | (2022.01) | |
| H04L 67/12 | (2022.01) | |

(52) U.S. Cl.
CPC ............ *H04L 63/068* (2013.01); *G07C 5/008* (2013.01); *H04L 63/0435* (2013.01); *H04L 67/12* (2013.01)

(58) Field of Classification Search
CPC ... H04L 63/068; H04L 63/0435; H04L 67/12; G07C 5/008
See application file for complete search history.

(56) References Cited

U.S. PATENT DOCUMENTS

| | | |
|---|---|---|
| 8,965,695 B2 | 2/2015 | Tzamaloukas |
| 11,366,842 B1 | 6/2022 | Swaminathan |
| 2009/0033540 A1* | 2/2009 | Breed .................. G05D 1/0278 701/472 |

(Continued)

FOREIGN PATENT DOCUMENTS

| | | |
|---|---|---|
| CN | 104683112 B | 12/2017 |
| CN | 115862293 A | 3/2023 |
| WO | 2025/011848 A1 | 1/2025 |

OTHER PUBLICATIONS

"A Computing Model for Real-Time Traffic Data Processing", IP.com No. IPCOM000211243D, IP.com Electronic Publication Date: Sep. 29, 2011, 13 pps.

(Continued)

*Primary Examiner* — Normin Abedin
(74) *Attorney, Agent, or Firm* — Aaron N. Pontikos

(57) ABSTRACT

A computer-implemented method for distributing a copy of event data recorder (EDR) data of a vehicle includes sending index information uniquely identifying respective member vehicles of a dynamic vehicle network that include candidate vehicles located within a predetermined geo distance of a host vehicle, sending a fragment of a private key associated with EDR data of the host vehicle to the respective member vehicles of the dynamic vehicle network, distributing segments of replicated EDR data from the host vehicle among the respective member vehicles, and responsive to an expiration of a predetermined lifecycle duration associated with the dynamic vehicle network and an absence of an incident of the host vehicle: disbanding the dynamic vehicle network, and initiating a next dynamic vehicle network including a set of next candidate vehicles.

20 Claims, 3 Drawing Sheets

(56) References Cited

U.S. PATENT DOCUMENTS

2013/0282277 A1* 10/2013 Rubin .................. G08G 1/09
 701/517
2020/0294401 A1* 9/2020 Kerecsen ............... G08G 1/205

OTHER PUBLICATIONS

"Extended Incident Information Gathering in Car P2P Networks", An IP.com Prior Art Database Technical Disclosure IP.com No. IPCOM000172102D, Original Publication Date: Jun. 27, 2008, 2 pps.

"Improving Traffic Management With Big Data Analytics", Case Study Intel® Xeon® Processor E5 Series, Traffic Management, Big Data Analytics, Improv, © 2013, Intel Corporation. All rights reserved, 2 pps.

"Map Initiated Asset Monitoring and Incident Management", An IP.com Prior Art Database Technical Disclosure IP.com No. IPCOM000264949D, IP.com Electronic Publication Date: Feb. 10, 2021, 12 pps.

"Method and System for Road Traffic Accidents Prevention", An IP.com Prior Art Database Technical Disclosure IP.com No. IPCOM000253597D, IP.com Electronic Publication Date: Apr. 16, 2018, 5 pps.

"Rollover Data Special Study—Final Report", DOT HS 811 435, NHTSA, Jan. 2011, 66 pps.

Shen, et al., "Secure and Efficient Data Sharing in Dynamic Vehicular Networks", IEEE Internet of Things Journal, vol. 7, No. 9, Sep. 2020, 10 pps.

U.S. Dept of Transportation, "Information Sharing for Traffic Incident Management", Aug. 2008, 54 pps.

International Searching Authority, "Notification of Transmittal of the International Search Report and the Written Opinion of the international Searching Authority, or Declaration," Patent Cooperation Treaty, Jul. 15, 2024, 14 pages, International Application No. PCT/EP2024/066060.

* cited by examiner

VEHICLE INCIDENT DATA RECOVERY OF DISTRIBUTED VEHICLE EVENT DATA

BACKGROUND

The present invention relates to recovery of vehicle event data and more specifically, to distributing recorded event data to member vehicles of a dynamic vehicle network.

Contemporary transportation vehicles embrace a growing complement of technologies and automation, such as global positioning systems (GPS), edge computing communication, and vehicle-to-vehicle (V2V) communications. V2V communications can exchange information regarding the operation of vehicles, such as speed and position of surrounding vehicles. V2V communication enables vehicles to broadcast and receive omni-directional messages up to 10 times per second, establishing a 360° awareness of vehicles in near proximity. In addition to current use of radars and cameras to detect potential threats during vehicle operation, V2V communication technology enhances avoidance of threats by offering alerts or in some cases automated responses.

Vehicles may be configured with an event data recorder (EDR), which includes the on-board recording and saving of multiple vehicle conditions and attributes when triggered by an event, such as sudden change in acceleration, direction, or safety feature deployment. In some cases, an EDR device may continuously record vehicle operational data in a loop, writing over previous data after completing a recording of a loop. The EDR device typically records and saves data during a set time period from before, during, and after the detection of a vehicle incident. EDR data may include occupant behavior (i.e., number of people in the car, who is wearing a seatbelt); driver inputs (steering, accelerator and brake); the position, speed and yaw angle of the automobile; and other details like the deployment of safety systems and passenger protection systems, as well as the force of any impact that might take place, combined with a diagnostic of the automobile's systems taken during the same period of time.

EDR data is often used in reconstruction and investigation of vehicle incidents, such as break-downs, loss of control, collisions, fire, failure of vehicle features, and other events often referred to as accidents. The data also include information about the performance of vehicle functions, systems and safety features, and can contribute to identifying design issues or discrepancies between specifications and performance. Such information and feedback can be used to further improve incident avoidance, performance of vehicle features, and safety features protecting drivers and passengers. In some jurisdictions (i.e., states), EDR data is considered part of the property of the vehicle, and therefore the property of the owner of the vehicle. In such jurisdictions, access to the EDR data by other than the owner requires permission. In some cases, the EDR data is protected by encryption and requires a private key of the owner to access and view/analyze the recorded data. In other cases, within different jurisdictions, EDR data may be transmitted to a central data center that is used to facilitate vehicle incident investigations, however, data volume and transmission lag and/or interference may limit the availability and usefulness of a centralized data storage. Conversely, EDR data may be compromised as a result of a vehicle incident, such as a collision, fire, theft, or performance failure of vehicle features (e.g., unexpected air bag deployment, failure of ABS systems, autonomous vehicle failure, etc.).

SUMMARY

According to various embodiments of the present invention, a computer-implemented method, computer program product, and computer system are provided for distributing a copy of event data recorder (EDR) data of a host vehicle. The computer-implemented method includes sending, by one or more processors, index information uniquely identifying respective member vehicles of a dynamic vehicle network. The member vehicles of the dynamic vehicle network include candidate vehicles located within a predetermined geo distance of a host vehicle. The computer-implemented method further includes sending, by the one or more processors, a fragment of a private key associated with EDR data of the host vehicle to the respective member vehicles located within a predetermined geo distance of a host vehicle. The computer-implemented method further includes distributing, by the one or more processors, segments of replicated EDR data from the host vehicle among the respective member vehicles. The EDR data segment is associated with an index identification of the respective member vehicles and includes a timestamp of the segment of the EDR data. The computer-implemented method further includes, responsive to an expiration of a predetermined lifecycle duration associated with the dynamic vehicle network and an absence of an incident of the host vehicle, disbanding, by one or more processors, the dynamic vehicle network, and initiating a next dynamic vehicle network including a set of next candidate vehicles.

DETAILED DESCRIPTION

Figure 1:
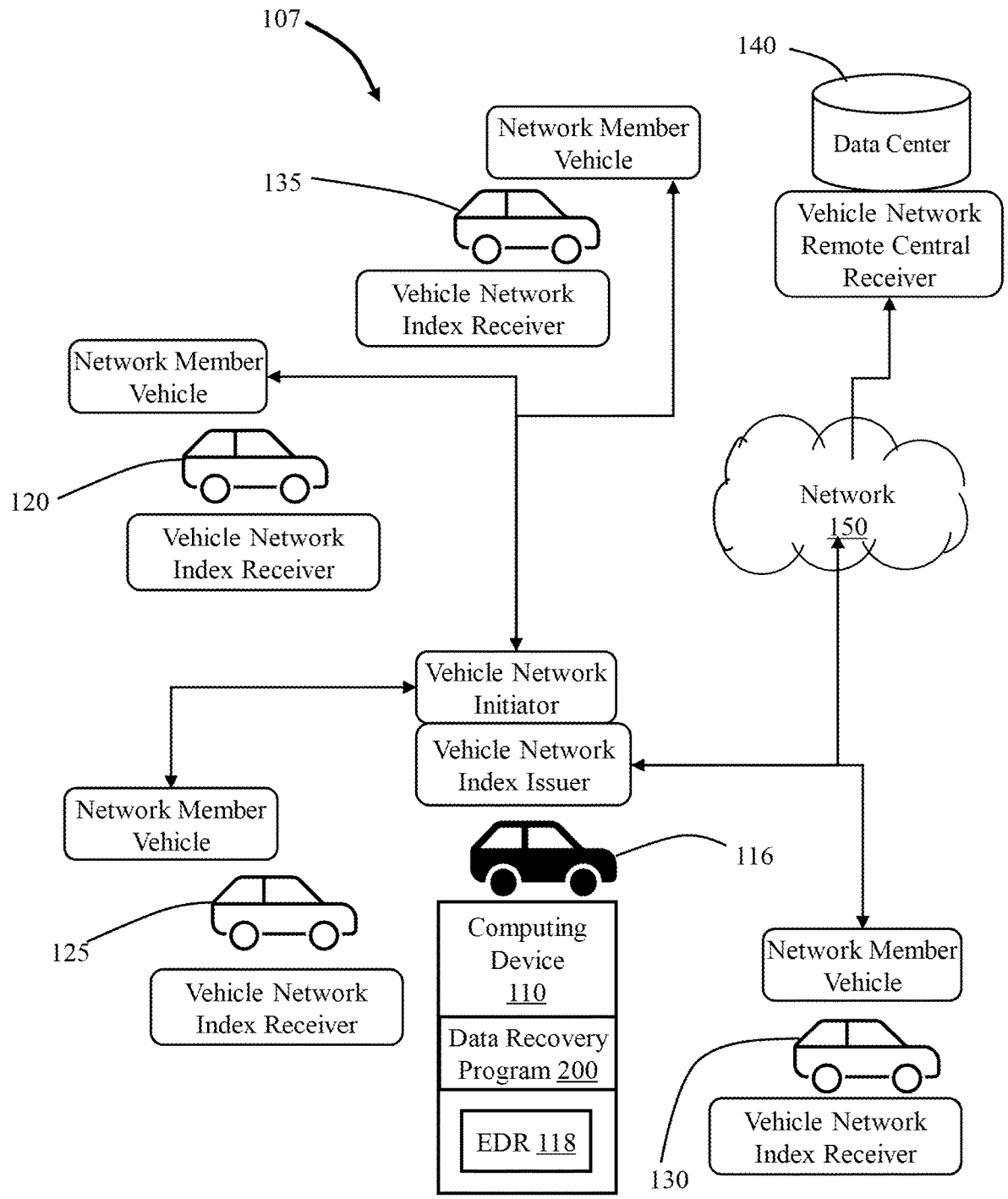
FIG. 1 is a functional block diagram illustrating a gas separation cell, in accordance with an embodiment of the present invention.

Embodiments of the present invention recognize that many contemporary vehicles include technology devices that are designed to detect vehicle incidents occurring and record and save vehicle-related data prior to, during, and after the incident occurrence. Vehicle incidents may include accidents involving collisions, loss of vehicle control, fire, and vehicle feature failure, among others are recorded and saved on event data recorder (EDR) devices, which have been included in the manufacturing of certain vehicles for years, and which can be included as an after-market accessory.

Existing use of EDR data can be compromised as a result of the incident the vehicle has experienced, or by injury of the owner of the vehicle in which a private key to decrypt the EDR data is otherwise not known or available. To improve the availability of accurate data following a vehicle incident, a solution is needed to securely restore the vehicle data from an incident even when the vehicle local storage is destroyed. The secure availability of event data recorder data is also valuable for semi autonomic or fully autonomic vehicles to understand actions taken and conditions of the driver and the vehicle before, during and after an incident occurs. For example, whether the driver is able to override the control of the vehicle or whether safety features responded as expected.

Embodiments recognize that EDR data is intended as read-only data saved in local storage of the vehicle in the event of a vehicle incident, which often is retrievable only by the vehicle owner (i.e., holder of a private key to decrypt the EDR data). Embodiments recognize that the possibility of distorting or otherwise affecting the data to avoid adverse incident investigation results exists, which suggests that sending the EDR data to a validation center may be frequently practiced. Embodiments also recognize that as a result of a vehicle incident, a massive amount of data may be generated in a brief period of time, requiring local storage, however, in severe incidents the local storage of data may be damaged or destroyed.

In certain jurisdictions, embodiments recognize the EDR data is considered as part of the property of the owner of the vehicle, and as such the access to the data may be protected and require the owner to access or provide permission to others to access the EDR data. As part of the protection of EDR data, recordings are typically encrypted and stored locally, which requires a private key to decrypt the data, and the private key may only be available to the vehicle owner. In a severe incident in which the stored data is damaged or the vehicle owner (as a driver) is severely injured, the decryption private key may not be provided or available. If the owner is unable to provide the private key for decryption of the EDR data due to incapacitation or unwillingness, decryption of the EDR data of an incident may not be possible and investigations may remain incomplete. Access to EDR data associated with vehicle incidents provides valuable insight into the moments immediately before, during, and after a vehicle incident and may provide even greater value for incidents involving semi-autonomous and fully autonomous vehicles as they become more common and greater in number.

Because EDR data of a vehicle incident can present an accurate and unbiased accounting of driver actions, vehicle status, performance, condition, and passenger information, the ability to recover EDR data otherwise unavailable can provide clarity to contributions to the incident and provides valuable information for continuous improvement of vehicle operational and safety features.

According to one embodiment of the present invention, a computer-implemented method for distributing event data recorder (EDR) data of a host vehicle is provided. The computer-implemented method includes sending, by one or more processors, index information uniquely identifying respective member vehicles of a dynamic vehicle network. The member vehicles of the dynamic vehicle network include candidate vehicles located within a predetermined geo distance of a host vehicle. The computer-implemented method further includes sending, by the one or more processors, a fragment of a private key associated with EDR data of the host vehicle to the respective member vehicles located within a predetermined geo distance of a host vehicle. The computer-implemented method further includes distributing, by the one or more processors, segments of replicated EDR data from the host vehicle among the respective member vehicles. The EDR data segment is associated with an index identification of the respective member vehicles and includes a timestamp of the segment of the EDR data. The computer-implemented method further includes, responsive to an expiration of a predetermined lifecycle duration associated with the dynamic vehicle network and an absence of an incident of the host vehicle, disbanding, by one or more processors, the dynamic vehicle network, and initiating a next dynamic vehicle network including a set of next candidate vehicles. enabling reconstruction of the private key for decryption of retrieved EDR data.

Distributing the segmented EDR data to local storage among a plurality of member vehicles of a dynamic vehicle network, created during the operation of the host vehicle and member vehicles, enables reconstruction of the private key for decryption of the recovered EDR data in the event of damage or distortion of the EDR data following an incident of the host vehicle. Sharing fragments of the private key among the member vehicles of the dynamic vehicle network enables the decryption of the recovered EDR data without any one vehicle being able to determine or reconstruct the private key. Identification of the member vehicles of the dynamic vehicle network allows investigators to recover and reconstruct the EDR data and decryption key, even in cases in which the locally recorded and saved EDR data is unrecoverable or remains encrypted due to an unavailable decryption key.

An advantageous aspect of the invention includes the one or more processors locating near-by vehicles during operation in which the near-by distance is pre-determined or limited by connectivity technology. Vehicle-to-vehicle (V2V) communication technology may be used to locate vehicles, and GPS data to determine the proximity of the near-by vehicles to the host vehicle. For example, the one or more processors communicates with multiple other vehicles via V2V communication and receives data from the multiple vehicles of their respective GPS position, and determines which vehicles are within a pre-determined geo distance from the host vehicle. The geo distance (i.e., geodetic distance) is the distance measured along the surface of the earth. The host vehicle and the multiple other vehicles are in operation (i.e., traveling) during the location activity by the host vehicle, providing an advantage over current technology for selection of candidate vehicles within a predetermined distance of a host vehicle and enabling a sequence of forming and disbanding dynamic vehicle networks during operation and travel of the host vehicle and candidate vehicles.

An advantageous aspect of the invention includes the one or more processors sending invitations to the located near-by vehicles to dynamically join a vehicle network. The one or more processors invites a plurality of vehicles within the pre-defined geo distance to join a dynamic vehicle network, also referred to, herein as "the vehicle network", or "the network." The other near-by vehicles control whether they receive or block invitations to join the dynamic vehicle network or, in some embodiments of the present invention, the other near-by vehicles may choose to not participate in V2V communications and as such, not be located. The one or more processors initiates the invitations to the plurality of vehicles located within the pre-defined geo distance and determined to travel in a direction and/or path similar to that of the host vehicle.

An advantageous aspect of the invention includes the one or more processors receiving a vehicle identification number (VIN) along with confirmation of a near-by vehicle to accept the sent invitation and join the vehicle network. As a nearby vehicle joins the vehicle network, aspects of the invention assign an index to the joining vehicle, such that the index provides a unique identification of the joining vehicle as a "member vehicle" of the vehicle network, and the index is associated with EDR data, and a fragment and offset of a private key distributed among all the member vehicles of the vehicle network (discussed in detail, below). In embodiments of the present invention, an index may be numeric, binary, characters, strings, or any combination that can be used to distinctly identify a member vehicle within an instance of a dynamic vehicle network. The receipt of the VIN of the respective member vehicles joining the current dynamic vehicle network provides a definitive identification of member vehicles, and the assignment of index information enables data assignment to respective member vehicles for the current dynamic vehicle network and avoids confounding data sent to a vehicle that is included in multiple dynamic vehicle networks sequentially.

In some embodiments, the VIN and index associated with a respective member vehicle of the dynamic vehicle network are sent to a remote data center, which is typically used as a data source for vehicle incidents or accident investigations. An advantageous aspect of the invention includes the one or more processors sending the VIN and index associated with a respective vehicle of the newly formed dynamic vehicle network to a central data store, enabling identification of the network member vehicles and which vehicle is associated with which index designation for the duration of the network. In some embodiments, the VIN and index information is encrypted, protecting identities of the member vehicles while allowing decryption in the event of an incident occurring with the host vehicle. In some embodiments, the VIN and index information is sent to the member vehicles to store temporarily for the duration of the dynamic vehicle network as a redundancy to sending the information to a central data store. The temporary duration of the dynamic vehicle network along with disbanding the dynamic vehicle network after expiration of a predetermined lifecycle of duration improves the practice of EDR data recording by enabling recording and distribution of EDR data segments as a recoverable alternate source of EDR data in the event of damage or loss of EDR data stored on the host vehicle.

An advantageous aspect of the invention includes a limited lifecycle duration for the dynamic vehicle network, making each instance of a dynamic vehicle network, temporary. The dynamic vehicle network expiration of the lifecycle duration may be initiated by criteria that includes, a function of time, a distance traveled, by the departure of a member vehicle of the network outside of the predetermined geo distance, or by the signal strength of a V2V connection falling below a threshold minimum, for example. Subsequent to the expiration of the lifecycle duration of the vehicle network, the one or more processors disband the current set of member vehicles as the current network and proceed to create a next set of member vehicles to form a next dynamic vehicle network, while the host vehicle and located near-by vehicles are actively operating.

An advantageous aspect of the invention includes the one or more processors segmenting the EDR data in which a segment of the data and a timestamp associated with the segment of data is encrypted and sent to at least one member vehicle of the dynamic vehicle network. Segments of the EDR data are distributed to the member vehicles of the dynamic vehicle network and are associated with a timestamp and the index assigned to the respective member vehicle. An advantage is achieved over current EDR data recording practice by distributing segmented EDR data among a plurality of member vehicles of the dynamic vehicle network. The distribution of segments of EDR data provides protection against privacy concerns of the data as no single member vehicle includes all the EDR data, and the data is sent in an encrypted format. Embodiments of the present invention are not limited by the type of segmenting as any segmenting algorithm may be used.

An advantageous aspect of the invention includes the one or more processors fragmenting the private key used by the host vehicle or the owner of the host vehicle to decrypt the EDR data. The private key is used to decrypt the segments of EDR data sent to member vehicles of the dynamic vehicle network. By fragmenting the private key and distributing the fragments of the private key along with a position offset associated with the private key fragment among the member vehicles of the dynamic vehicle network, no single member vehicle has adequate private key information to decrypt the EDR data segments stored on the respective member vehicle. An aspect of the invention sends the fragment of the private key unencrypted in a text format. By identifying the member vehicles and retrieving the text format fragments and position offsets of the private key, the private key can be reconstructed and used by an investigator to recover and decrypt the distributed EDR data segments and the associated timestamps from the member vehicles. The offsets associated with the fragments of the private key provide a position of the fragment within the reconstructed private key. The timestamps enable the reconstruction of the EDR data chronologically. The current practice provides the private key to the exclusive access by the host vehicle owner, creating exposure to access and decryption of the EDR data.

An advantageous aspect of the invention includes the one or more processors recovering EDR data in the event of an incident occurring with the host vehicle and the inability of EDR data recovery and decryption of the data directly from the host vehicle and/or the vehicle owner. In cases in which an incident occurs with the host vehicle and the EDR data storage device is damaged, leaving the EDR data unrecoverable from the host vehicle, or the private key to decrypt the EDR data is not available due to a condition of the vehicle owner (i.e., as a driver of the host vehicle when the incident occurred), embodiments of the present invention provide an alternative means of recovering and decrypting the EDR data. If the EDR data stored on the host vehicle is damaged or inaccessible due to the host vehicle owner being injured or otherwise incapacitated in an incident, current practice is unable to decrypt and analyze the EDR data.

An advantageous aspect of the invention includes the one or more processors disbanding the dynamic vehicle network subsequent to the expiration of the limited lifecycle duration. The lifecycle duration of the dynamic vehicle network is pre-determined and can be based on a function of time, a distance covered by the host vehicle and member vehicles, and/or by the departure of a member vehicle, and is not limited by the factor determining the lifecycle duration. Embodiments of the present invention instruct the member vehicles to delete the segments of EDR data received and the fragment of the private key and offset subsequent to the initiation of disbanding the current dynamic vehicle network. The aspect leaves the storage of EDR data, private key fragment, and shared VIN and index information as temporary, protecting privacy while providing an alternative to recover and reconstruct EDR data, if an incident occurs during the lifecycle of the dynamic vehicle network.

An advantageous aspect of the invention includes the one or more processors forming a next dynamic vehicle network subsequent to disbanding the current dynamic vehicle network. The host vehicle repeats the location and invitation of near-by vehicles as next candidate vehicles to join as a set of next member vehicles forming a next dynamic vehicle network. In some embodiments, a vehicle from the disbanded current dynamic vehicle network may rejoin as part of the next dynamic vehicle network if the vehicle continues operation within the pre-defined geo distance of the host vehicle. Aspects of the invention establish the VIN and index designations for each of the next member vehicles of the next dynamic vehicle network and proceed to segment and distribute portions of the EDR data to respective next member vehicles of the next dynamic vehicle network, as well as fragmenting and sending fragments of the private key and offset to the respective next member vehicles.

According to another embodiment of the present invention, a computer system for distributing event data recorder (EDR) data of a host vehicle is provided. The computer system includes a computer processor, at least one computer-readable storage medium, and program instructions stored on the at least one computer-readable storage medium that are executed by the computer processor. The processor executes program instructions to send index information uniquely identifying respective member vehicles of a dynamic vehicle network. The member vehicles of the dynamic vehicle network include candidate vehicles located within a predetermined geo distance of a host vehicle. The processor further executes program instructions to send a fragment of a private key associated with EDR data of the host vehicle to the respective member vehicles located within a predetermined geo distance of a host vehicle. The processor further executes instructions to distribute segments of replicated EDR data from the host vehicle among the respective member vehicles. The EDR data segment is associated with an index identification of the respective member vehicles and includes a timestamp of the segment of the EDR data. The processor further executes program instructions to, responsive to an expiration of a predetermined lifecycle duration associated with the dynamic vehicle network and an absence of an incident of the host vehicle, disband the dynamic vehicle network, and initiate a next dynamic vehicle network including a set of next candidate vehicles.

Distributing the segmented EDR data to local storage among a plurality of member vehicles of a dynamic vehicle network, created during the operation of the host vehicle and member vehicles, enables reconstruction of the private key for decryption of the recovered EDR data in the event of damage or distortion of the EDR data following an incident of the host vehicle. Sharing fragments of the private key among the member vehicles of the dynamic vehicle network enables the decryption of the recovered EDR data without any one vehicle being able to determine or reconstruct the private key. Identification of the member vehicles of the dynamic vehicle network allows investigators to recover and reconstruct the EDR data and decryption key, even in cases in which the locally recorded and saved EDR data is unrecoverable or remains encrypted due to an unavailable decryption key.

An advantageous aspect of the invention includes the processor executing program instructions to locate near-by vehicles during operation in which the near-by distance is pre-determined or limited by connectivity technology. Vehicle-to-vehicle (V2V) communication technology may be used to locate vehicles, and GPS data to determine the proximity of the near-by vehicles to the host vehicle. For example, the processor communicates with multiple other vehicles via V2V communication and receives data from the multiple vehicles of their respective GPS position, and determines which vehicles are within a pre-determined geo distance from the host vehicle. The geo distance (i.e., geodetic distance) is the distance measured along the surface of the earth. The host vehicle and the multiple other vehicles are in operation (i.e., traveling) during the location activity by the host vehicle, providing an advantage over current technology for selection of candidate vehicles within a predetermined distance of a host vehicle and enabling a sequence of forming and disbanding dynamic vehicle networks during operation and travel of the host vehicle and candidate vehicles.

An advantageous aspect of the invention includes the processor executing program instructions to send invitations to the located near-by vehicles to dynamically join a vehicle network. a plurality of vehicles within the pre-defined geo distance to join a dynamic vehicle network, also referred to, herein as "the vehicle network", or "the network." The other near-by vehicles control whether they receive or block invitations to join the dynamic vehicle network or, in some embodiments of the present invention, the other near-by vehicles may choose to not participate in V2V communications and as such, not be located. Invitations are sent to the plurality of vehicles located within the pre-defined geo distance and determined to travel in a direction and/or path similar to that of the host vehicle.

An advantageous aspect of the invention includes the processor executing program instructions to receive a vehicle identification number (VIN) along with confirmation of a near-by vehicle to accept the sent invitation and join the vehicle network. As a nearby vehicle joins the vehicle network, aspects of the invention assign an index to the joining vehicle, such that the index provides a unique identification of the joining vehicle as a "member vehicle" of the vehicle network, and the index is associated with EDR data, and a fragment and offset of a private key distributed among all the member vehicles of the vehicle network (discussed in detail, below). In embodiments of the present invention, an index may be numeric, binary, characters, strings, or any combination that can be used to distinctly identify a member vehicle within an instance of a dynamic vehicle network. The receipt of the VIN of the respective member vehicles joining the current dynamic vehicle network provides a definitive identification of member vehicles, and the assignment of index information enables data assignment to respective member vehicles for the current dynamic vehicle network and avoids confounding data sent to a vehicle that is included in multiple dynamic vehicle networks sequentially.

In some embodiments, the VIN and index associated with a respective member vehicle of the dynamic vehicle network are sent to a remote data center, which is typically used as a data source for vehicle incidents or accident investigations. An advantageous aspect of the invention includes the processor executing program instructions to send the VIN and index associated with a respective vehicle of the newly formed dynamic vehicle network to a central data store, enabling identification of the network member vehicles and which vehicle is associated with which index designation for the duration of the network. In some embodiments, the VIN and index information is encrypted, protecting identities of the member vehicles while allowing decryption in the event of an incident occurring with the host vehicle. In some embodiments, the VIN and index information is sent to the member vehicles to store temporarily for the duration of the dynamic vehicle network as a redundancy to sending the information to a central data store. The temporary duration of the dynamic vehicle network along with disbanding the dynamic vehicle network after expiration of a predetermined lifecycle of duration improves the practice of EDR data recording by enabling recording and distribution of EDR data segments as a recoverable alternate source of EDR data in the event of damage or loss of EDR data stored on the host vehicle.

An advantageous aspect of the invention includes a limited lifecycle duration for the dynamic vehicle network, making each instance of a dynamic vehicle network, temporary. The dynamic vehicle network expiration of the lifecycle duration may be initiated by criteria that includes, a function of time, a distance traveled, by the departure of a member vehicle of the network outside of the predetermined geo distance, or by the signal strength of a V2V connection falling below a threshold minimum, for example. Subsequent to the expiration of the lifecycle duration of the vehicle network, the processor executes program instructions to disband the current set of member vehicles as the current network and proceed to create a next set of member vehicles to form a next dynamic vehicle network, while the host vehicle and located near-by vehicles are actively operating.

An advantageous aspect of the invention includes the processor executing program instructions to segment the EDR data in which a segment of the data and a timestamp associated with the segment of data is encrypted and sent to at least one member vehicle of the dynamic vehicle network. Segments of the EDR data are distributed to the member vehicles of the dynamic vehicle network and are associated with a timestamp and the index assigned to the respective member vehicle. An advantage is achieved over current EDR data recording practice by distributing segmented EDR data among a plurality of member vehicles of the dynamic vehicle network. The distribution of segments of EDR data provides protection against privacy concerns of the data as no single member vehicle includes all the EDR data, and the data is sent in an encrypted format. Embodiments of the present invention are not limited by the type of segmenting as any segmenting algorithm may be used.

An advantageous aspect of the invention includes the processor executing program instructions to fragment the private key used by the host vehicle or the owner of the host vehicle to decrypt the EDR data. The private key is used to decrypt the segments of EDR data sent to member vehicles of the dynamic vehicle network. By fragmenting the private key and distributing the fragments of the private key along with a position offset associated with the private key fragment among the member vehicles of the dynamic vehicle network, no single member vehicle has adequate private key information to decrypt the EDR data segments stored on the respective member vehicle. An aspect of the invention sends the fragment of the private key unencrypted in a text format. By identifying the member vehicles and retrieving the text format fragments and position offsets of the private key, the private key can be reconstructed and used by an investigator to recover and decrypt the distributed EDR data segments and the associated timestamps from the member vehicles. The offsets associated with the fragments of the private key provide a position of the fragment within the reconstructed private key. The timestamps enable the reconstruction of the EDR data chronologically. The current practice provides the private key to the exclusive access by the host vehicle owner, creating exposure to access and decryption of the EDR data.

An advantageous aspect of the invention includes the processor executing program instructions to recover EDR data in the event of an incident occurring with the host vehicle and the inability of EDR data recovery and decryption of the data directly from the host vehicle and/or the vehicle owner. In cases in which an incident occurs with the host vehicle and the EDR data storage device is damaged, leaving the EDR data unrecoverable from the host vehicle, or the private key to decrypt the EDR data is not available due to a condition of the vehicle owner (i.e., as a driver of the host vehicle when the incident occurred), embodiments of the present invention provide an alternative means of recovering and decrypting the EDR data. If the EDR data stored on the host vehicle is damaged or inaccessible due to the host vehicle owner being injured or otherwise incapacitated in an incident, current practice is unable to decrypt and analyze the EDR data.

An advantageous aspect of the invention includes the processor executing program instructions to disband the dynamic vehicle network subsequent to the expiration of the limited lifecycle duration. The lifecycle duration of the dynamic vehicle network is pre-determined and can be based on a function of time, a distance covered by the host vehicle and member vehicles, and/or by the departure of a member vehicle, and is not limited by the factor determining the lifecycle duration. Embodiments of the present invention instruct the member vehicles to delete the segments of EDR data received and the fragment of the private key and offset subsequent to the initiation of disbanding the current dynamic vehicle network. The aspect leaves the storage of EDR data, private key fragment, and shared VIN and index information as temporary, protecting privacy while providing an alternative to recover and reconstruct EDR data, if an incident occurs during the lifecycle of the dynamic vehicle network.

An advantageous aspect of the invention includes the process executing program instructions to form a next dynamic vehicle network subsequent to disbanding the current dynamic vehicle network. The host vehicle repeats the location and invitation of near-by vehicles as next candidate vehicles to join as a set of next member vehicles forming a next dynamic vehicle network. In some embodiments, a vehicle from the disbanded current dynamic vehicle network may rejoin as part of the next dynamic vehicle network if the vehicle continues operation within the pre-defined geo distance of the host vehicle. Aspects of the invention establish the VIN and index designations for each of the next member vehicles of the next dynamic vehicle network and proceed to segment and distribute portions of the EDR data to respective next member vehicles of the next dynamic vehicle network, as well as fragmenting and sending fragments of the private key and offset to the respective next member vehicles.

According to another embodiment of the present invention, a computer program product for distributing event data recorder (EDR) data of a host vehicle is provided. The computer program product includes at least one computer-readable storage medium, and program instructions stored on the at least one computer-readable storage medium. The program instructions include instructions to send index information uniquely identifying respective member vehicles of a dynamic vehicle network. The member vehicles of the dynamic vehicle network include candidate vehicles located within a predetermined geo distance of a host vehicle. The program instructions further include instructions to send a fragment of a private key associated with EDR data of the host vehicle to the respective member vehicles located within a predetermined geo distance of a host vehicle. The program instructions further include instructions to distribute segments of replicated EDR data from the host vehicle among the respective member vehicles. The EDR data segment is associated with an index identification of the respective member vehicles and includes a timestamp of the segment of the EDR data. The program instructions further include, responsive to an expiration of a predetermined lifecycle duration associated with the dynamic vehicle network and an absence of an incident of the host vehicle, instructions to disband the dynamic vehicle network, and initiate a next dynamic vehicle network including a set of next candidate vehicles.

Distributing the segmented EDR data to local storage among a plurality of member vehicles of a dynamic vehicle network, created during the operation of the host vehicle and member vehicles, enables reconstruction of the private key for decryption of the recovered EDR data in the event of damage or distortion of the EDR data following an incident of the host vehicle. Sharing fragments of the private key among the member vehicles of the dynamic vehicle network enables the decryption of the recovered EDR data without any one vehicle being able to determine or reconstruct the private key. Identification of the member vehicles of the dynamic vehicle network allows investigators to recover and reconstruct the EDR data and decryption key, even in cases in which the locally recorded and saved EDR data is unrecoverable or remains encrypted due to an unavailable decryption key.

An advantageous aspect of the invention includes program instructions to locate near-by vehicles during operation in which the near-by distance is pre-determined or limited by connectivity technology. Vehicle-to-vehicle (V2V) communication technology may be used to locate vehicles, and GPS data to determine the proximity of the near-by vehicles to the host vehicle. For example, the host vehicle communicates with multiple other vehicles via V2V communication and receives data from the multiple vehicles of their respective GPS position, and determines which vehicles are within a pre-determined geo distance from the host vehicle. The geo distance (i.e., geodetic distance) is the distance measured along the surface of the earth. The host vehicle and the multiple other vehicles are in operation (i.e., traveling) during the location activity by the host vehicle, providing an advantage over current technology for selection of candidate vehicles within a predetermined distance of a host vehicle and enabling a sequence of forming and disbanding dynamic vehicle networks during operation and travel of the host vehicle and candidate vehicles.

An advantageous aspect of the invention includes program instructions to send invitations to the located near-by vehicles to dynamically join a vehicle network. a plurality of vehicles within the pre-defined geo distance to join a dynamic vehicle network, also referred to, herein as "the vehicle network", or "the network." The other near-by vehicles control whether they receive or block invitations to join the dynamic vehicle network or, in some embodiments of the present invention, the other near-by vehicles may choose to not participate in V2V communications and as such, not be located. Invitations are sent to the plurality of vehicles located within the pre-defined geo distance and determined to travel in a direction and/or path similar to that of the host vehicle.

An advantageous aspect of the invention includes program instructions to receive a vehicle identification number (VIN) along with confirmation of a near-by vehicle to accept the sent invitation and join the vehicle network. As a nearby vehicle joins the vehicle network, aspects of the invention assign an index to the joining vehicle, such that the index provides a unique identification of the joining vehicle as a "member vehicle" of the vehicle network, and the index is associated with EDR data, and a fragment and offset of a private key distributed among all the member vehicles of the vehicle network (discussed in detail, below). In embodiments of the present invention, an index may be numeric, binary, characters, strings, or any combination that can be used to distinctly identify a member vehicle within an instance of a dynamic vehicle network. The receipt of the VIN of the respective member vehicles joining the current dynamic vehicle network provides a definitive identification of member vehicles, and the assignment of index information enables data assignment to respective member vehicles for the current dynamic vehicle network and avoids confounding data sent to a vehicle that is included in multiple dynamic vehicle networks sequentially.

In some embodiments, the VIN and index associated with a respective member vehicle of the dynamic vehicle network are sent to a remote data center, which is typically used as a data source for vehicle incidents or accident investigations. An advantageous aspect of the invention includes the processor executing program instructions to send the VIN and index associated with a respective vehicle of the newly formed dynamic vehicle network to a central data store, enabling identification of the network member vehicles and which vehicle is associated with which index designation for the duration of the network. In some embodiments, the VIN and index information is encrypted, protecting identities of the member vehicles while allowing decryption in the event of an incident occurring with the host vehicle. In some embodiments, the VIN and index information is sent to the member vehicles to store temporarily for the duration of the dynamic vehicle network as a redundancy to sending the information to a central data store. The temporary duration of the dynamic vehicle network along with disbanding the dynamic vehicle network after expiration of a predetermined lifecycle of duration improves the practice of EDR data recording by enabling recording and distribution of EDR data segments as a recoverable alternate source of EDR data in the event of damage or loss of EDR data stored on the host vehicle.

An advantageous aspect of the invention includes a limited lifecycle duration for the dynamic vehicle network, making each instance of a dynamic vehicle network, temporary. The dynamic vehicle network expiration of the lifecycle duration may be initiated by criteria that includes, a function of time, a distance traveled, by the departure of a member vehicle of the network outside of the predetermined geo distance, or by the signal strength of a V2V connection falling below a threshold minimum, for example. Subsequent to the expiration of the lifecycle duration of the vehicle network, the processor executes program instructions to disband the current set of member vehicles as the current network and proceed to create a next set of member vehicles to form a next dynamic vehicle network, while the host vehicle and located near-by vehicles are actively operating.

An advantageous aspect of the invention includes program instructions to segment the EDR data in which a segment of the data and a timestamp associated with the segment of data is encrypted and sent to at least one member vehicle of the dynamic vehicle network. Segments of the EDR data are distributed to the member vehicles of the dynamic vehicle network and are associated with a timestamp and the index assigned to the respective member vehicle. An advantage is achieved over current EDR data recording practice by distributing segmented EDR data among a plurality of member vehicles of the dynamic vehicle network. The distribution of segments of EDR data provides protection against privacy concerns of the data as no single member vehicle includes all the EDR data, and the data is sent in an encrypted format. Embodiments of the present invention are not limited by the type of segmenting as any segmenting algorithm may be used.

An advantageous aspect of the invention includes program instructions to fragment the private key used by the host vehicle or the owner of the host vehicle to decrypt the EDR data. The private key is used to decrypt the segments of EDR data sent to member vehicles of the dynamic vehicle network. By fragmenting the private key and distributing the fragments of the private key along with a position offset associated with the private key fragment among the member vehicles of the dynamic vehicle network, no single member vehicle has adequate private key information to decrypt the EDR data segments stored on the respective member vehicle. An aspect of the invention sends the fragment of the private key unencrypted in a text format. By identifying the member vehicles and retrieving the text format fragments and position offsets of the private key, the private key can be reconstructed and used by an investigator to recover and decrypt the distributed EDR data segments and the associated timestamps from the member vehicles. The offsets associated with the fragments of the private key provide a position of the fragment within the reconstructed private key. The timestamps enable the reconstruction of the EDR data chronologically. The current practice provides the private key to the exclusive access by the host vehicle owner, creating exposure to access and decryption of the EDR data.

An advantageous aspect of the invention includes program instructions to recover EDR data in the event of an incident occurring with the host vehicle and the inability of EDR data recovery and decryption of the data directly from the host vehicle and/or the vehicle owner. In cases in which an incident occurs with the host vehicle and the EDR data storage device is damaged, leaving the EDR data unrecoverable from the host vehicle, or the private key to decrypt the EDR data is not available due to a condition of the vehicle owner (i.e., as a driver of the host vehicle when the incident occurred), embodiments of the present invention provide an alternative means of recovering and decrypting the EDR data. If the EDR data stored on the host vehicle is damaged or inaccessible due to the host vehicle owner being injured or otherwise incapacitated in an incident, current practice is unable to decrypt and analyze the EDR data.

An advantageous aspect of the invention includes program instructions to disband the dynamic vehicle network subsequent to the expiration of the limited lifecycle duration. The lifecycle duration of the dynamic vehicle network is pre-determined and can be based on a function of time, a distance covered by the host vehicle and member vehicles, and/or by the departure of a member vehicle, and is not limited by the factor determining the lifecycle duration. Embodiments of the present invention instruct the member vehicles to delete the segments of EDR data received and the fragment of the private key and offset subsequent to the initiation of disbanding the current dynamic vehicle network. The aspect leaves the storage of EDR data, private key fragment, and shared VIN and index information as temporary, protecting privacy while providing an alternative to recover and reconstruct EDR data, if an incident occurs during the lifecycle of the dynamic vehicle network.

An advantageous aspect of the invention includes program instructions to form a next dynamic vehicle network subsequent to disbanding the current dynamic vehicle network. The host vehicle repeats the location and invitation of near-by vehicles as next candidate vehicles to join as a set of next member vehicles forming a next dynamic vehicle network. In some embodiments, a vehicle from the disbanded current dynamic vehicle network may rejoin as part of the next dynamic vehicle network if the vehicle continues operation within the pre-defined geo distance of the host vehicle. Aspects of the invention establish the VIN and index designations for each of the next member vehicles of the next dynamic vehicle network and proceed to segment and distribute portions of the EDR data to respective next member vehicles of the next dynamic vehicle network, as well as fragmenting and sending fragments of the private key and offset to the respective next member vehicles.

The aforementioned advantages are example advantages, and not all advantages are discussed. Furthermore, embodiments of the present disclosure can exist that contain all, some, or none of the aforementioned advantages while remaining within the spirit and scope of the present disclosure.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

The present invention will now be described in detail with reference to the Figures. FIG. 1 is a functional block diagram illustrating a dynamic vehicle network that includes distributed data processing, generally designated 107, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 depicts dynamic vehicle network 107 in which event data recorder (EDR) data is distributed for a limited lifecycle duration. Dynamic vehicle network 107 includes host vehicle 116, network member vehicles 120, 125, 130, and 135, and data center 140 connected to dynamic vehicle network 107 via network 150. Dynamic vehicle network 107 is a local network between vehicles in operation, communicating via vehicle-to-vehicle (V2V) technology and exchanging information that may include position, direction, speed, as well as other information. Dynamic vehicle network 107 is formed dynamically while vehicles are in operation and includes vehicles invited by a host vehicle, such as host vehicle 116. The invited vehicles decide whether to "opt in" after receiving the invitation to join the network. Dynamic vehicle network is temporary and includes a limited lifecycle of duration, which is pre-determined and may expire based on time, distance traveled, and member vehicles exiting the network (e.g., departing the host vehicle in a different direction or extended distance from the host vehicle). A next dynamic vehicle network may be formed subsequent to disbanding of a current dynamic vehicle network, and the formation and disbanding may continuously occur as the host vehicle travels and member vehicles are found to join the network.

Host vehicle 116 is a vehicle in operation and includes computing device 110, which is configured to operate data recovery program 200 and includes hardware and software to enable event data recording by EDR 118. In embodiments of the present invention, host vehicle 116 travels on a roadway/path toward a destination. Host vehicle 116, via data recovery program 200 operating on computing device 110, initiates invitations to other vehicles in a nearby vicinity to join the dynamic vehicle network 107. The nearby vicinity is a pre-determined distance and may be further limited to vehicles determined to be in operation and traveling in a direction and path similar to that of host vehicle 116 as determined by global positioning system (GPS) data exchanged between vehicles by V2V communications. Host vehicle 116, via data recovery program 200, is an issuer of an index as a unique identifier of a respective member vehicle of dynamic vehicle network 107.

Computing device 110 operates on host vehicle 116 and includes data recovery program 200 and is communicatively connected to EDR 118. In some embodiments, computing device 110 can be a vehicle-installed computing device enabled to send, receive, and process data and instructions and communicate with network member vehicles 120, 125, 130, and 135, as well as communicating with data center 140 via network 150. In some embodiments, computing device 110 is similar in structure and function to end-user device 103 of FIG. 1.

Data recovery program 200 provides recoverable EDR data distributed in segments among a plurality of member vehicles that have opted-in to join a dynamic vehicle network. The segmentation and distribution of EDR data of the host vehicle supports post-incident investigation by enabling recovery of vehicle data in the event of an incident occurring with the host vehicle that destroys, damages, or otherwise renders the EDR data on the host vehicle inaccurate or unavailable. EDR data capture vehicle condition and operation attributes immediately before, during, and after the occurrence of an incident, such as an accident, collision, fire, loss of control, or other triggered vehicle action.

Data recovery program 200 is initiated and sends invitations for joining a vehicle network to candidate vehicles that are within a pre-determined range of the host vehicle on which data recovery program 200 operates. Data recovery program 200 communicates to the nearby vehicles via V2V communication technology and receives confirmation of candidate vehicles opting in to join the dynamic vehicle network as member vehicles and the VIN of the respective member vehicles. Data recovery program 200 assigns an index to each member vehicle as a unique identifier within the network and sends an encrypted VIN and text-based index assigned identifier of the respective member vehicles to a central data storage repository. The sending of the encrypted VIN and text-based index information to the central data storage occurs promptly after the formation of the dynamic vehicle network and receipt of the VIN and assignment of network index identification. In some embodiments, the VIN and/or index identifier of member vehicles are shared among the member vehicles of the dynamic vehicle network to enable vehicle and data identification if access to the central storage data is unavailable. In some embodiments the current network index identification information is replicated periodically and sent to the remote central data storage.

Data recovery program 200 performs fragmentation of the private key of the host vehicle used to decrypt EDR data. Data recovery program 200 creates fragments of the private key and distributes a fragment to each of the member vehicles of the dynamic vehicle network. The fragments are created using any existing method and are distributed unencrypted in text format and include an offset of the position of the fragment within the reconstructed private key. The fragmentation of the private key occurs promptly after the network is formed and each fragment is stored on a respective member vehicle of the dynamic vehicle network. In some embodiments of the present invention, the fragmentation and offset data along with the index identification of the respective member vehicles is sent to the remote central data storage, promptly after the network is formed and the fragmentation and distribution are complete. Fragmentation and distribution of the private key portions prevent a member vehicle from decrypting EDR data.

Data recovery program 200 replicates and segments the EDR data from the event data recording device. Data recovery program 200 distributes the segments to the respective member vehicles of the dynamic vehicle network and, in some embodiments, data recovery program 200 uses V2V communication technology for the segment distribution. The segments of the EDR data of the host vehicle include portions of the vehicle control and operation data, and are distributed to member vehicles in an encrypted format so that the privacy of the data is protected, as no individual vehicle has the entire private key required to decrypt the data and the VINs shared among member vehicles are in an encrypted format. The member vehicles of the dynamic vehicle network do not consume or use the segmented data, rather, it is stored to provide a redundant copy of EDR data that can be recovered and reconstructed for vehicle incident investigation by authorized authorities.

The dynamic vehicle network created by data recovery program 200 is a temporary network with a limited lifecycle duration. In some embodiments, the expiration of the dynamic vehicle network may be triggered by a time duration, whereas in other embodiments the expiration of the network may be triggered by a distance traveled. In still other embodiments, the expiration of the dynamic vehicle network may occur due to one or more of the member vehicles departing as a member vehicle, by a change of direction, or exceeding a distance from the host vehicle. In some embodiments, all members of the vehicle network backup each other's EDR data including encrypted VIN of the respective vehicles ensuring integrity and security All segmented data and private key fragments are deleted upon expiration of the network if data recovery program 200 has not detected an incident occurring with the host vehicle. If an incident occurs, the data segments sent to the member vehicles of the dynamic vehicle network remain stored for a pre-determined period for potential recovery availability. Subsequent to the storage duration expiring and no detection of an incident occurrence, the segmented EDR data, the text format private key fragment, and the index and encrypted VIN information stored on member vehicles during the limited lifecycle duration of the dynamic vehicle network are deleted.

EDR 118 is an event data recording device and includes data storage capacity to store vehicle control, operation, and performance data associated with the host vehicle. For example, EDR 118 records vehicle data such as velocity, acceleration change, occupant behavior (i.e., number of people in the car, who is wearing a seatbelt); driver inputs (steering, accelerator, and brake); the position, speed and yaw angle of the automobile; and other details like the deployment of safety systems and passenger protection systems, as well as the force of any impact that might take place, combined with a diagnostic of the automobile's systems taken during the same period of time. In some cases, the EDR data is considered sensitive, private data, and protected by encryption with a unique public-private key pair. The private key is typically available only to the vehicle owner.

EDR 118 records event data when sudden changes are detected, recording relatively massive amounts of data in a very short period of time, which includes seconds before the incident event, during the incident event, and seconds after the incident event. In some embodiments, EDR 118 is unable to share recorded data with a central data storage repository, such as data center 140, and EDR 118 may be damaged during the incident or tampered with subsequent to the incident, leaving the segmented copies of the EDR data as the surviving or accurate data source.

Network member vehicle 120, network member vehicle 125, network member vehicle 130, and network member vehicle 135 are vehicles operating within a pre-determined distance from host vehicle 116. Network member vehicles 120, 125, 130, and 135 receive invitations to join a dynamic vehicle network from data recovery program 200 operating on computing device 110 of host vehicle 116. Network member vehicles 120, 125, 130, and 135 respond to the invitation by "opting in" to join the vehicle network or respond by "opting out" or ignoring the invitation to not join the vehicle network. Network member vehicles 120, 125, 130, and 135 include VIN information in their respective "opt-in" response.

In response to joining the vehicle network, network member vehicles 120, 125, 130, and 135 receive a unique index identifying respective vehicles within the network and receive a fragment of host vehicle 116's private key in a text format, along with index and encrypted VIN information of the network member vehicles. Network member vehicles 120, 125, 130, and 135 receive encrypted segments of the recorded EDR data from host vehicle 116 and store the segments on local storage. If an incident is detected for host vehicle 116, the segmented EDR data is stored on the respective network member vehicles 120, 125, 130, and 135 for a pre-determined period pending recovery of the EDR data, if necessary.

Data center 140 is a centralized repository that stores EDR data when received from host vehicle 116 after the occurrence of an incident if the incident does not damage EDR 118 or the incident prevents sending EDR data to data center 140. Data Center 140 is communicatively connected to host vehicle 116 via network 150.

Network 150 provides a communicative connection between computing device 110 operating on host vehicle 116 and data center 140. Network 150 can be, for example, a local area network (LAN), a telecommunications network, a wide area network (WAN), such as the Internet, a virtual local area network (VLAN), or any combination that can include wired, wireless, or optical connections. In some embodiments, network 150 may be a wide area network (WAN) 102 depicted in FIG. 3. In general, network 150 can be any combination of connections and protocols that will support data transmission and communications between computing device 110 of dynamic vehicle network 107 and data center 140.

Figure 2:
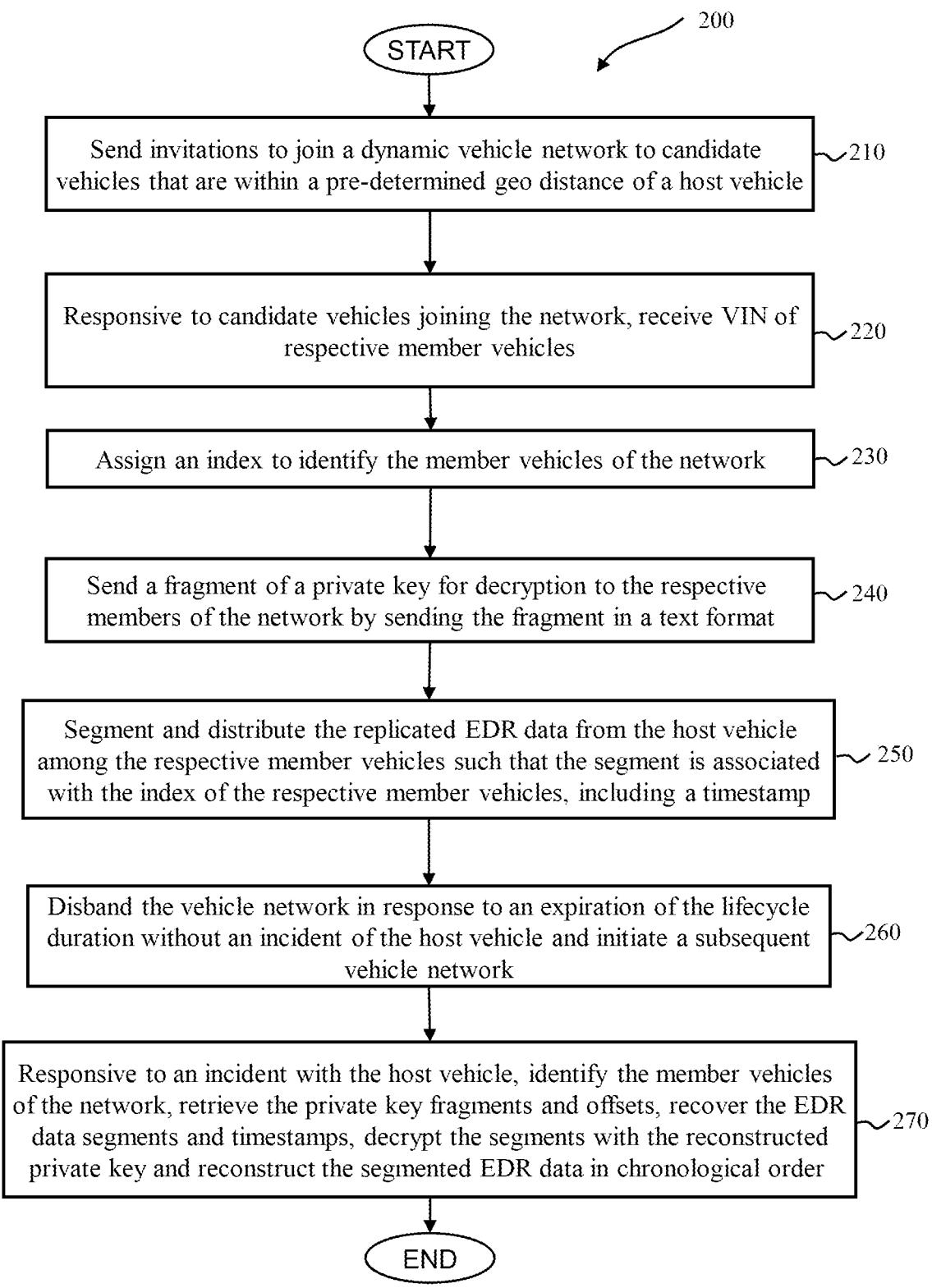
FIG. 2 depicts a flowchart for a data recovery program including distribution of a copy of event data recorder (EDR) data of a host vehicle, in accordance with an embodiment of the present invention.

FIG. 2 depicts a flowchart for data recovery program 200 including segmented distribution of a copy of event data recorder (EDR) data of a host vehicle, in accordance with an embodiment of the present invention. Data recovery program 200 provides an alternate source of EDR data of a vehicle incident when the EDR data has been damaged, destroyed, or tampered with as a result of the incident. Data recovery program 200 enables recovery of the EDR data from segmented portions of the EDR data distributed among member vehicles of a dynamic vehicle network by reconstructing a fragmented private key to identify the member vehicles and decrypt the segmented data.

Data recovery program 200 sends invitations to join a dynamic vehicle network to candidate vehicles within a pre-determined geo distance of a host vehicle (step 210). Data recovery program 200 sends requests to other vehicles within a pre-defined range/distance of the host vehicle, to join in forming a temporary network of vehicles to share distributed segments of EDR data and other data to enable recovery of the EDR data should the data stored on the host vehicle become destroyed, damaged, or inaccurate due to tampering. The invitations are sent as requests and receiving vehicles voluntarily elect to join the dynamic vehicle network of their own accord. The acceptance of the invitation is controlled by the candidate vehicles.

For example, data recovery program 200 sends invitation notices to other vehicles in operation that are within a pre-determined geo distance, which may include determining the distance from host vehicle 116, the direction of travel, the velocity, and the position of the candidate vehicles. Data recovery program 200 sends invitations to operating vehicles that appear to be traveling towards the same or similar destination as host vehicle 116. Data recovery program 200 sends the invitation via V2V communications which may include transmission via network 150.

Data recovery program 200, in response to candidate vehicles joining the dynamic vehicle network, receives VINs of respective member vehicles (step 220). The candidate vehicles that "opt-in" to join the dynamic vehicle network include their respective VIN along with concurrence to join the network. The VINs provide an identification of the member vehicles to assist in the recovery of EDR data as needed. The dynamic vehicle network is formed between the member vehicles and the host vehicle.

For example, data recovery program 200 operating on host vehicle 116 receives responses from the candidate vehicles indicating whether they "opt-in" or "opt-out" (or do not respond) of joining dynamic vehicle network 107. The vehicles that "opt-in" are member vehicles of the network and provide their respective VINs to data recovery program 200.

Data recovery program 200 assigns an index to identify the respective member vehicles within the dynamic vehicle network (step 230). Each member vehicle of the dynamic vehicle network is identified by data recovery program 200 assigning an index designation within the dynamic vehicle network. The index becomes associated with data distributed to member vehicles to facilitate recovery of the data in the event of an incident with the host vehicle in which the EDR data is not available for analysis by investigators. Data recovery program 200 sends the index information and encrypted VINs of respective member vehicles to the member vehicles of the newly formed dynamic vehicle network. Data recovery program 200 sends the VINs and index information to a central data storage promptly after the network is formed. The dynamic vehicle network is a temporary network with a limited lifecycle duration. The local cluster of network vehicles is built just for a duration and disassociated after lifecycle expiration criteria are met. Subsequently, the next dynamic vehicle network will be built while the host vehicle and candidate vehicles are driving. The member vehicle ID list of VINs and index information maps to the corresponding set of member vehicles in the current dynamic vehicle network, which can be checked by the timestamps when the member vehicle ID list is generated.

For example, data recovery program 200 assigns an index to each of network member vehicle 120, network member vehicle 125, network member vehicle 130, and network member vehicle 135 (collectively referred to as the member vehicles) of the dynamic vehicle network and shares the index information and the encrypted VIN associated with the index to the member vehicles. Data recovery program 200 sends the index information and associated VINs to data center 140, for example, within the first few minutes of the formation of the dynamic vehicle network.

Data recovery program 200 sends a fragment of a private key, used for decryption, to the respective members of the network by sending the fragment in a text format (step 240). The host vehicle owner typically has the only access to the private key to decrypt the EDR data. Data recovery program 200, with the consent of the host vehicle owner, fragments the private key into portions and distributes the fragments among the member vehicles of the dynamic vehicle network. Embodiments of the present invention use any fragmentation algorithm that can be used to successfully fragment and reassemble the private key into its original state. Data recovery program 200 includes an offset along with the fragment to indicate the position of the fragment in the reconstruction of the private key. The fragments are distributed unencrypted in a text format to member vehicles. The fragmentation and distribution of the fragments occur promptly after data recovery program 200 receives the consent of the member vehicles and forms the dynamic vehicle network. Each of the member vehicles only has a fragment of the private key and cannot decrypt the segments of EDR data, and the fact that the private key is distributed across several member vehicles in operation makes reconstruction of the private key a very low probability.

For example, data recovery program 200 uses a fragmentation technique that fragments the binary form of the private key into subcomponent strings of ones and zeros. Each of the fragments is accompanied by an offset that indicates the position of the fragment within the original private key. Network member vehicles 120, 125, 130, and 135 each receive a fragment of the private key and an offset. The fragment is sent in a text format of a subcomponent of the binary form of the private key. Data recovery program 200 identifies the particular fragment and offset sent with the index of the receiving member vehicle. Each of the member vehicles is unaware of what subcomponent and offset of the private key is received by itself and the fragments and offset sent to other member vehicles.

Data recovery program 200 segments and distributes the replicated EDR data from the host vehicle among the respective member vehicles such that a segment is associated with an index of a respective member vehicle and includes a timestamp of the data segment (step 250). Data recovery program 200 replicates segments of the recorded EDR data and sends a respective segment to a respective member vehicle and is associated with the index of the member vehicle and a timestamp of the segment of EDR data. In this manner, all the EDR data is distributed, segment by segment, to the member vehicles of the dynamic vehicle network. Each segment is encrypted to protect the data contained in the segment and stored locally on the member vehicle along with the timestamp and index information corresponding to the receiving member vehicle. When decrypted by reconstruction of a fragmented private key, the segmented EDR data and timestamp will be recovered and chronologically reconstructed.

For example, data recovery program 200 operating on host vehicle 116, replicates a first segment of the EDR data recorded and sends the segment to network member vehicle 130, along with a timestamp of the segment of data. Segmentation of the data continues and data recovery program 200 proceeds to send segments and corresponding timestamps to network member vehicles 120, 135, and 125, and may continue to segment and distribute the segments and timestamps until all of the EDR data has been sent. In some embodiments, the order in which member vehicles are sent segments of EDR data may continuously change and may include multiple consecutive segments to the same member vehicle.

Data recovery program 200 disbands the current dynamic vehicle network in response to an expiration of the lifecycle duration of the network without an incident of the host vehicle and initiates a next dynamic vehicle network (step 260). The current dynamic vehicle network has a limited lifecycle duration which is pre-determined and may include multiple expiration criteria. Absent an incident occurring with the host vehicle, the current dynamic vehicle network may be disbanded based on an elapsed time threshold, exceeding a distance threshold, departure of a member vehicle from the current vehicle network, or may be disbanded due to the intensity of a V2V signal of a member vehicle falling below a threshold level. Data recovery program 200 determines that no incident has occurred with the host vehicle, detects the triggering expiration criteria, and initiates disbanding the current dynamic vehicle network by communicating to the member vehicles via V2V communications. Data recovery program 200 provides instructions for member vehicles to delete the received segments of EDR data and the fragment and offset of the private key. In some embodiments, when the dynamic vehicle network is formed, disbanding criteria may be included as instruction from data recovery program 200 to the member vehicles. In some embodiments, if the member vehicle loses contact with data recovery program 200 via V2V communication from the host vehicle for a pre-determined duration of time, then disbanding instructions are initiated, including instructions to delete segmented data, timestamps, shared VIN and index information and private key fragments and offsets.

In some embodiments, subsequent to disbanding the current dynamic vehicle network and providing instruction to the member vehicles of the current dynamic vehicle network being disbanded, data recovery program 200 initiates a next dynamic vehicle network by locating and inviting a next set of candidate vehicles to join the next dynamic vehicle network.

For example, network member vehicle 125 leaves the roadway that host vehicle 116, and network vehicles 120, 130, and 135 are traveling and as network member vehicle 125 moves further away from the current dynamic vehicle network, the V2V communication signal intensity falls below a predetermined threshold. Data recovery program 200 detects the expiration criteria and initiates disbanding of the current dynamic vehicle network and sends instructions to the member vehicles to delete the segmented EDR data, timestamps, index information, shared encrypted VINs, and the fragment and offset of the private key. Network member vehicle 125 is out of range of receiving V2V communication with data recovery program 200 but after a pre-determined duration of not receiving communication with the host vehicle, network member vehicle 125 initiates deletion of received EDR data segments, timestamps, index, and VINs shared, and the fragment and offset of the private key received by network member vehicle 125. Subsequent to disbanding the current dynamic vehicle network that included network vehicles 120, 125, 130 and 135, data recovery program 200 initiates a next dynamic vehicle network by locating a set of next candidate vehicles within the predetermined geo distance and sending invitations to the set of next candidate vehicles to join the next dynamic vehicle network.

Data recovery program 200, responsive to an incident with the host vehicle, identifies the member vehicles of the network, retrieves the private key fragments and offsets, recovers the EDR data segments and timestamps, decrypts the segments with the reconstructed private key, and reconstructs the segmented EDR data in chronological order (step 270). In some embodiments, data recovery program 200 detects the incident involving the host vehicle and sends instructions to respective member vehicles to retain the stored EDR data segments. In some embodiments, data recovery program 200 operates post-detection of an incident involving the host vehicle under the direction, and in some cases, authority, of an investigation agency.

Having detected the occurrence of an incident with the host vehicle, data recovery program 200 identifies the member vehicles of the dynamic vehicle network using the index information and retrieves the distributed private key fragments and corresponding offsets. Data recovery program 200 reconstructs the private key based on the offsets and fragments sent to the member vehicles in text format. The private key is reconstructed by applying the offset information accompanying the distribution of the private key fragments to respective member vehicles. Data recovery program 200 decrypts the EDR data segments and timestamp information using the reconstructed private key. Data recovery program 200 retrieves the segments of EDR data and corresponding timestamps distributed among the member vehicles of the dynamic vehicle network. Data recovery program 200 reconstructs the EDR data based on the index information and timestamps of the EDR data segments retrieved.

In some embodiments, decryption of the locally stored EDR data on the host vehicle may not be possible for incident investigators in situations in which the host vehicle owner/driver has been seriously incapacitated by an incident with the host vehicle, or results in a fatality. Embodiments of the present invention provide an alternative means of recovering and decrypting the EDR data while providing security for the distributed data.

For example, data recovery program 200 detects that host vehicle 116 is involved in an incident and sends instructions to member vehicles of the dynamic vehicle network to retain the stored EDR data segments that have been received. An investigation agency initiates data recovery program 200 to retrieve the fragments and offsets of the private key distributed among network member vehicles 120, 125, 130, and 135 and reconstructs the private key based on the offsets of the position of each fragment in the original private key. Data recovery program 200 retrieves the distributed segments of the EDR data and corresponding timestamps that are encrypted. Using the reconstructed private key, data recovery program 200 decrypts the distributed segments and timestamps of the EDR data and reconstructs the EDR data in the proper time sequence based on the decrypted timestamp information.

One further example of an embodiment of the present invention includes vehicle A initializes a V2V local cluster of vehicles by sending invitations to join a first dynamic vehicle network. Responding with an "opt-in" acknowledgment are vehicles B, C, D, and E, and data recovery program 200 assigns index 1, 2, 3, and 4, respectively to vehicles B, C, D, and E. The index is sent to each vehicle as well as data center 140 on a remote server. Subsequent to initiating the network, the host vehicle, vehicle A, fragments its private key into 4 parts (the segmentation algorithm can be any existing algorithm), and each respective fragment is sent to a corresponding respective vehicle of B, C, D, and E based on the index of member vehicles B, C, D, and E. Subsequent to the recording of EDR data of vehicle A, data recovery program 200 periodically replicates segments of vehicle A's encrypted EDR data to B, C, D, and E. The segmentation and distribution method is not limited by embodiments of the present invention, the method could be round-robin replication, in a consistent order based on the vehicle index tag without duplication, or the method of distribution could send a segment of EDR data 2 vehicles with one duplication.

Each replicated EDR data segment includes a timestamp so that the segments can be merged in time sequence during the recovery of the EDR data. If no incident occurs with vehicle A as determined during a health check at a point of expiration of the lifecycle duration, vehicle A will issue an EDR data erasing instruction to each of member vehicles B, C, D, and E to remove the replicated data. In the event that an incident occurs with vehicle A and damage to vehicle A includes loss of local EDR data, the data sent to the remote data center server as the current dynamic vehicle network was formed, indicate which vehicles were member vehicles of the current dynamic vehicle network before the incident occurrence, and obtain the replicated segments of EDR data from the member vehicles.

Because the segments of EDR data are encrypted and each member vehicle has only one fragment of the private key, each of the member vehicles cannot decrypt the EDR data segments alone. Because the remote data center server includes the identification of the full set of member vehicles of the current dynamic vehicle network, only the delegated investigator will be able to obtain the data identifying the vehicles, reconstruct the private key fragments and decrypt the recovered EDR data segments assembled in sequential order. The local vehicle network is dynamically built from time to time while the host vehicle is operating, and the member cars joined are mostly random. Accordingly, embodiments of the present invention create difficulty to pre-define the dynamic vehicle network members before the occurrence of an incident with the host vehicle, and as such exposure of the encrypted EDR data is minimal.

Figure 3:
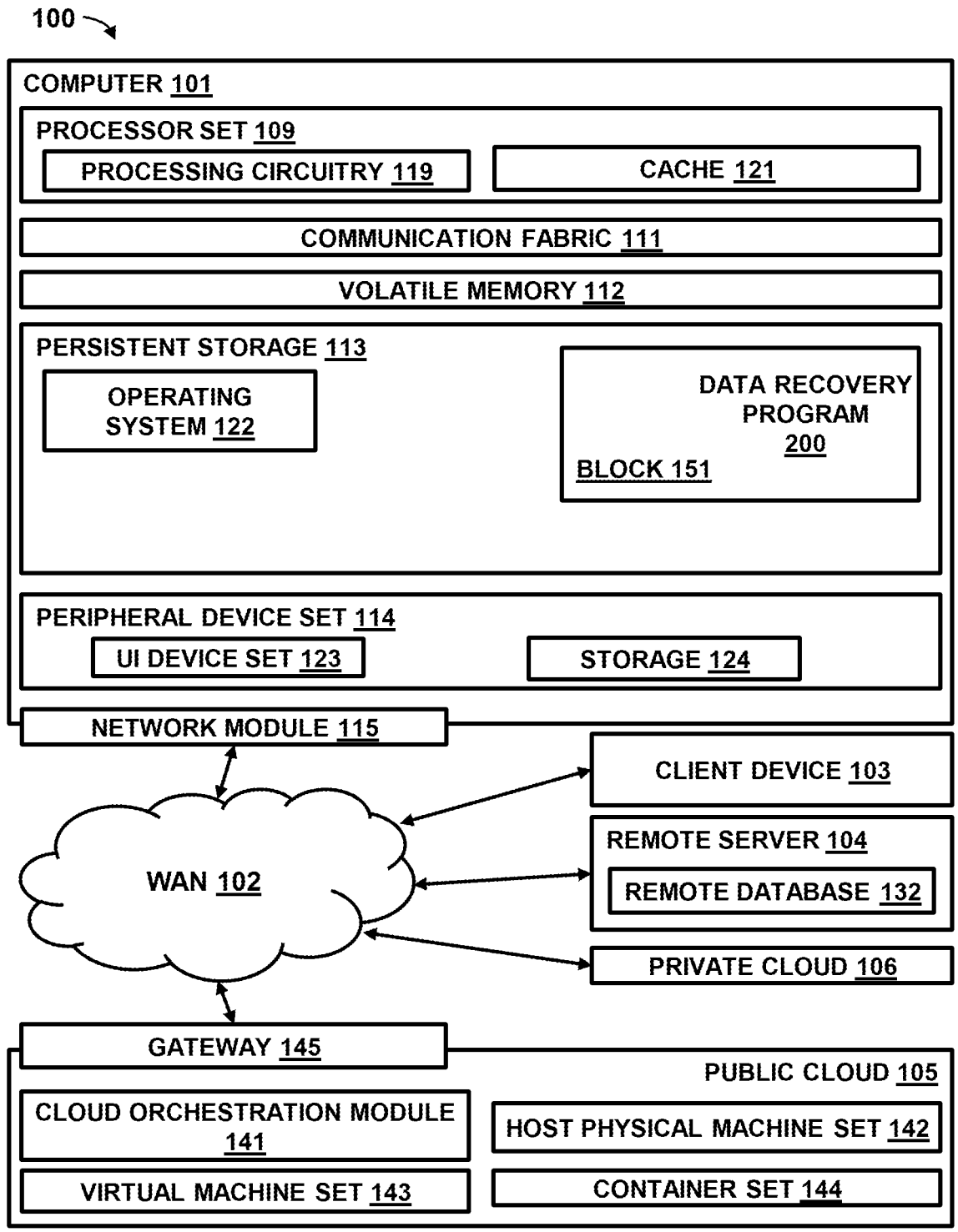
FIG. 3 depicts a block diagram of components of a computing system, including a computing device configured to operationally perform the data recovery program of FIG. 2, in accordance with an embodiment of the present invention.

FIG. 3 depicts a schematic illustration of exemplary network resources associated with practicing the disclosed inventions. The inventions may be practiced by the disclosed processors performing an instruction stream. As shown in FIG. 3, computing environment 100 contains an example of an environment for the execution of at least some of the computer code involved in performing the inventive methods, such as the method of data recovery program 200 in block 151, retained in persistent storage 113. In addition to block 151, computing environment 100 includes, for example, computer 101, wide area network (WAN) 102, end-user device (EUD) 103, remote server 104, public cloud 105, private cloud 106, and data center 140 operating as remote database 132 on remote server 104. In this embodiment, computer 101 includes processor set 109 (including processing circuitry 119 and cache 121), communication fabric 111, volatile memory 112, persistent storage 113 (including an operating system 122 and data recovery program 200 of block 151, as identified above), peripheral device set 114 (including user interface (UI), device set 123, storage 124, and network module 115.

Remote server 104 includes remote database 132, which in some embodiments may operate similar to data center 140

(FIG. 1). Public cloud 105 includes gateway 145, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 132. In some embodiments, computer 101 may take the form of a handheld device capable of receiving and sending data and performing computer instructions. In some embodiments, computer 101 may be configured and operate similar to computing device 110 depicted in FIG. 1 and operating on host vehicle 116. As is well understood in the art of computer technology, and depending upon the technology, the performance of a computer-implemented method may be distributed among multiple computers and/or between multiple locations. On the other hand, in this presentation of computing environment 100, a detailed discussion is focused on a single computing device, specifically computer 101, to keep the presentation as simple as possible. Computer 101 may be located in a cloud, even though it is not shown in a cloud in FIG. 3. On the other hand, computer 101 is not required to be in a cloud except to any extent as may be affirmatively indicated.

PROCESSOR SET 109 includes one, or more, computer processors of any type now known or to be developed in the future. Processing circuitry 119 may be distributed over multiple packages, for example, multiple, coordinated integrated circuit chips. Processing circuitry 119 may implement multiple processor threads and/or multiple processor cores. Cache 121 is memory that is located in the processor chip package(s) and is typically used for data or code that should be available for rapid access by the threads or cores running on processor set 109. Cache memories are typically organized into multiple levels depending upon relative proximity to the processing circuitry. Alternatively, some, or all, of the cache for the processor set may be located "off-chip." In some computing environments, processor set 109 may be designed for working with qubits and performing quantum computing.

Computer readable program instructions are typically loaded onto computer 101 to cause a series of operational steps to be performed by processor set 109 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 109 to control and direct the performance of the inventive methods. In computing environment 100, at least some of the instructions for performing the inventive methods may be stored in data recovery program 200 in block 151 of persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that are now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows the writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in the representative block of data recovery program 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 141 manages the transfer and storage of images, deploys new instantiations of VCEs, and manages active instantiations of VCE deployments. Gateway 145 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing a copy of event data recorder (EDR) data of a vehicle, the method comprising:

sending, by the one or more processors, index information uniquely identifying respective member vehicles of a dynamic vehicle network, wherein member vehicles of the dynamic vehicle network include candidate vehicles located within a predetermined geo distance of a host vehicle;

sending, by the one or more processors, a fragment of a private key associated with EDR data of the host vehicle to the respective member vehicles of the dynamic vehicle network, wherein the fragment is sent in a text format and includes a position offset of the fragment of the private key;

distributing, by the one or more processors, segments of replicated EDR data from the host vehicle among the respective member vehicles, wherein an EDR data segment is associated with an index identification of the respective member vehicles and includes a timestamp of the segment of the EDR data; and responsive to an expiration of a predetermined lifecycle duration associated with the dynamic vehicle network and an absence of an incident of the host vehicle, disbanding, by the one or more processors, the dynamic vehicle network, and initiating a next dynamic vehicle network including a set of next candidate vehicles.

2. The method of claim 1, wherein disbandment of the dynamic vehicle network includes sending instructions to the member vehicles of the dynamic vehicle network to delete the segments of replicated EDR data that is encrypted, the fragment of the private key and the position offset, the index information, and vehicle identification numbers (VINs) of the respective member vehicles shared with the member vehicles.

3. The method of claim 1, further comprises:
sending, by the one or more processors, invitations to the candidate vehicles within a pre-determined geo distance of the host vehicle to join the dynamic vehicle network; and
responsive to the candidate vehicles joining the dynamic vehicle network as the member vehicles, receiving, by the one or more processors, a vehicle identification number (VIN) of the respective member vehicles, wherein the invitations to join the dynamic vehicle network, responses from the candidate vehicles, and formation of the dynamic vehicle network occurs during operation of the host vehicle and the candidate vehicles.

4. The method of claim 1, wherein responsive to detecting the incident occurring to the host vehicle, saving the replicated EDR data distributed to the member vehicles in segments to local storage of the respective member vehicles.

5. The method of claim 1, wherein the dynamic vehicle network includes a temporary pre-determined lifecycle duration.

6. The method of claim 5, wherein the expiration of the pre-determined lifecycle duration is initiated by detection of at least one criterion selected from the group consisting of expiration of a pre-determined time period, exceeding a pre-determined distance traveled, and a V2V communication signal from at least one member vehicle of the dynamic vehicle network falling below a threshold of signal intensity.

7. The method of claim 1, wherein the member vehicles of the dynamic vehicle network include at least two member vehicles and the host vehicle.

8. The method of claim 1, wherein an encrypted vehicle identification number (VIN) of the respective member vehicles and the index information is sent to a central data repository for vehicle incident investigation following formation of the dynamic vehicle network, and prior to initiation of segmenting and sending EDR data to the member vehicles.

9. The method of claim 1, wherein the segments of EDR data and corresponding timestamps are encrypted using the private key.

10. The method of claim 1, further comprising:
responsive to detecting involvement of the host vehicle in the incident, sending, by the one or more processors, instructions to the member vehicles to retain stored segments of EDR data and corresponding timestamps;
retrieving, by the one or more processors, from the respective member vehicles, the fragment of the private key and the position offset sent to the respective members of the dynamic vehicle network;
reconstructing, by the one or more processors, the private key based on the index information and the position offset of respective fragments received from the member vehicles;
retrieving, by the one or more processors, the segments of replicated EDR data and corresponding timestamps from the respective member vehicles of the dynamic vehicle network, wherein the segments of replicated EDR data and the corresponding timestamps are encrypted;
decrypting, by the one or more processors, the segments of replicated EDR data and the corresponding timestamps using the private key; and
generating, by the one or more processors, the replicated EDR data based on the corresponding timestamps of the segments of replicated EDR data and the index information.

11. A system for distributing a copy of event data recorder (EDR) data of a vehicle, the method comprising:
a computer processor;
at least one computer-readable storage medium and program instructions stored on the at least one computer-readable storage medium that are executed by the computer processor, the program instructions comprising:
program instructions to send index information uniquely identifying respective member vehicles of a dynamic vehicle network, wherein member vehicles of the dynamic vehicle network include candidate vehicles located within a predetermined geo distance of a host vehicle;
program instructions to send a fragment of a private key associated with EDR data of the host vehicle to the respective member vehicles of the dynamic vehicle network, wherein the fragment is sent in a text format and includes a position offset of the fragment of the private key;
program instructions to distribute segments of replicated EDR data from the host vehicle among the respective member vehicles, wherein an EDR data segment is associated with an index identification of the respective member vehicles and includes a timestamp of the segment of the EDR data; and
responsive to an expiration of a predetermined lifecycle duration associated with the dynamic vehicle network and an absence of an incident of the host vehicle, program instructions to disband the dynamic vehicle network, and initiate a next dynamic vehicle network including a set of next candidate vehicles.

12. The computer system of claim 11, wherein program instructions to disband the dynamic vehicle network includes sending instructions to the member vehicles of the dynamic vehicle network to delete the segments of replicated EDR data that is encrypted, the fragment of the private key and the position offset, the index information, and vehicle identification numbers (VINs) of the respective member vehicles shared with the member vehicles.

13. The computer system of claim 11, further comprising:
sending, by the one or more processors, invitations to the candidate vehicles within a pre-determined geo distance of the host vehicle to join the dynamic vehicle network; and
responsive to the candidate vehicles joining the dynamic vehicle network as the member vehicles, receiving, by the one or more processors, a vehicle identification number (VIN) of the respective member vehicles, wherein the invitations to join the dynamic vehicle network, responses from the candidate vehicles, and formation of the dynamic vehicle network occurs while the host vehicle and the candidate vehicles are in operation, and wherein the dynamic vehicle network that is formed includes a predetermined lifecycle duration that is temporary.

14. The computer system of claim 11, wherein responsive to detecting the incident occurring to the host vehicle, saving the replicated EDR data distributed to the member vehicles in segments to local storage of the respective member vehicles.

15. The computer system of claim 11, wherein the expiration of the predetermined lifecycle duration is initiated by detection of at least one criterion selected from a group consisting of, expiration of a pre-determined time period, exceeding a pre-determined distance traveled, and a V2V communication signal from at least one member vehicle of the dynamic vehicle network falling below a threshold of signal intensity.

16. The computer system of claim 11, wherein an encrypted vehicle identification number (VIN) of the respective member vehicles and the index information is sent to a central data repository for vehicle incident investigation, following formation of the dynamic vehicle network and prior to initiation of segmenting and sending EDR data to the member vehicles.

17. The computer system of claim 11, further comprising:
responsive to detecting involvement of the host vehicle in the incident, program instructions to send instructions to the member vehicles to retain stored segments of EDR data and corresponding timestamps;
program instructions to retrieve from the respective member vehicles, the fragment of the private key and the position offset sent to the respective members of the dynamic vehicle network;
program instructions to reconstruct the private key based on the index information and the position offset of respective fragments received from the member vehicles;
program instructions to retrieve the segments of replicated EDR data and corresponding timestamps from the respective member vehicles of the dynamic vehicle network, wherein the segments of replicated EDR data and the corresponding timestamps are encrypted;
program instructions to decrypt the segments of replicated EDR data and the corresponding timestamps using the private key; and
program instructions to generate the replicated EDR data based on the corresponding timestamps of the segments of replicated EDR data and the index information.

18. The computer program product of claim 17, wherein program instructions to disband the dynamic vehicle network includes sending instructions to the member vehicles of the dynamic vehicle network to delete the segments of replicated EDR data that is encrypted, the fragment of the private key and the position offset, and the index information, and vehicle identification numbers (VINs) shared with the member vehicles, and wherein the expiration of the predetermined lifecycle duration is initiated by detection of at least one criterion selected from a group consisting of, expiration of a pre-determined time period, exceeding a pre-determined distance traveled, and a V2V communication signal from at least one member vehicle of the dynamic vehicle network falling below a threshold of signal intensity.

19. The computer program product of claim 17, further comprising:
responsive to detecting involvement of the host vehicle in the incident, program instructions to send instructions to the member vehicles to retain stored segments of EDR data and corresponding timestamps;
program instructions to retrieve from the respective member vehicles, the fragment of the private key and the position offset sent to the respective members of the dynamic vehicle network;
program instructions to reconstruct the private key based on the index information and the position offset of respective fragments received from the member vehicles;
program instructions to retrieve the segments of replicated EDR data and corresponding timestamps from the respective member vehicles of the dynamic vehicle network, wherein the segments of replicated EDR data and the corresponding timestamps are encrypted;
program instructions to decrypt the segments of replicated EDR data and the corresponding timestamps using the private key; and
program instructions to generate the replicated EDR data based on the corresponding timestamps of the segments of replicated EDR data and the index information.

20. A computer program product for distributing a copy of event data recorder (EDR) data of a vehicle, the method comprising:
at least one computer-readable storage medium, and program instructions stored on the at least one computer-readable storage medium, the program instructions comprising:
program instructions to send index information uniquely identifying respective member vehicles of a dynamic vehicle network, wherein member vehicles of the dynamic vehicle network include candidate vehicles located within a predetermined geo distance of a host vehicle;
program instructions to send a fragment of a private key associated with EDR data of the host vehicle to the respective member vehicles of the dynamic vehicle network, wherein the fragment is sent in a text format and includes a position offset of the fragment of the private key;
program instructions to distribute segments of replicated EDR data from the host vehicle among the respective member vehicles, wherein an EDR data segment is associated with an index identification of the respective member vehicles and includes a timestamp of the segment of the EDR data; and
responsive to an expiration of a predetermined lifecycle duration associated with the dynamic vehicle network and an absence of an incident of the host vehicle, program instructions to disband the dynamic vehicle network, and initiate a next dynamic vehicle network including a set of next candidate vehicles.

* * * * *